Figure 3:
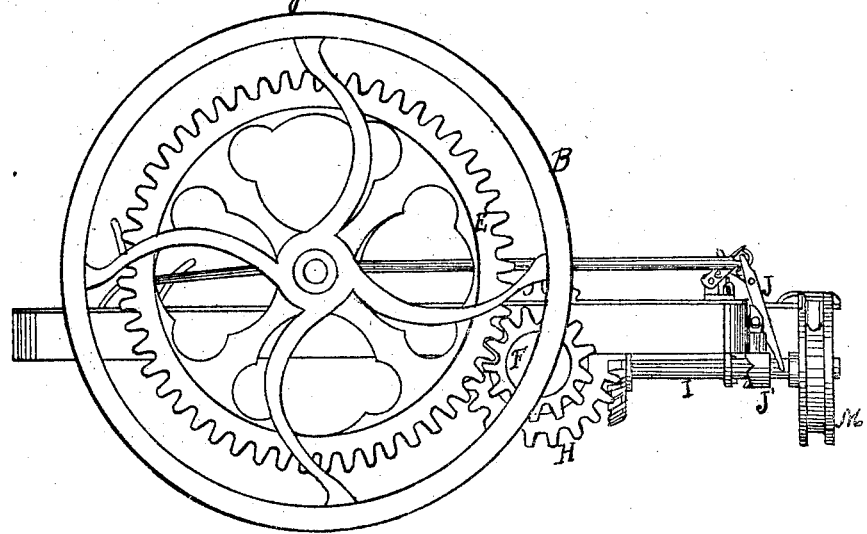
Figure 4:
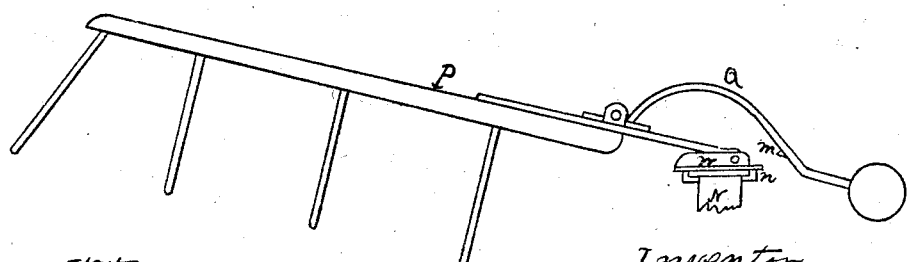

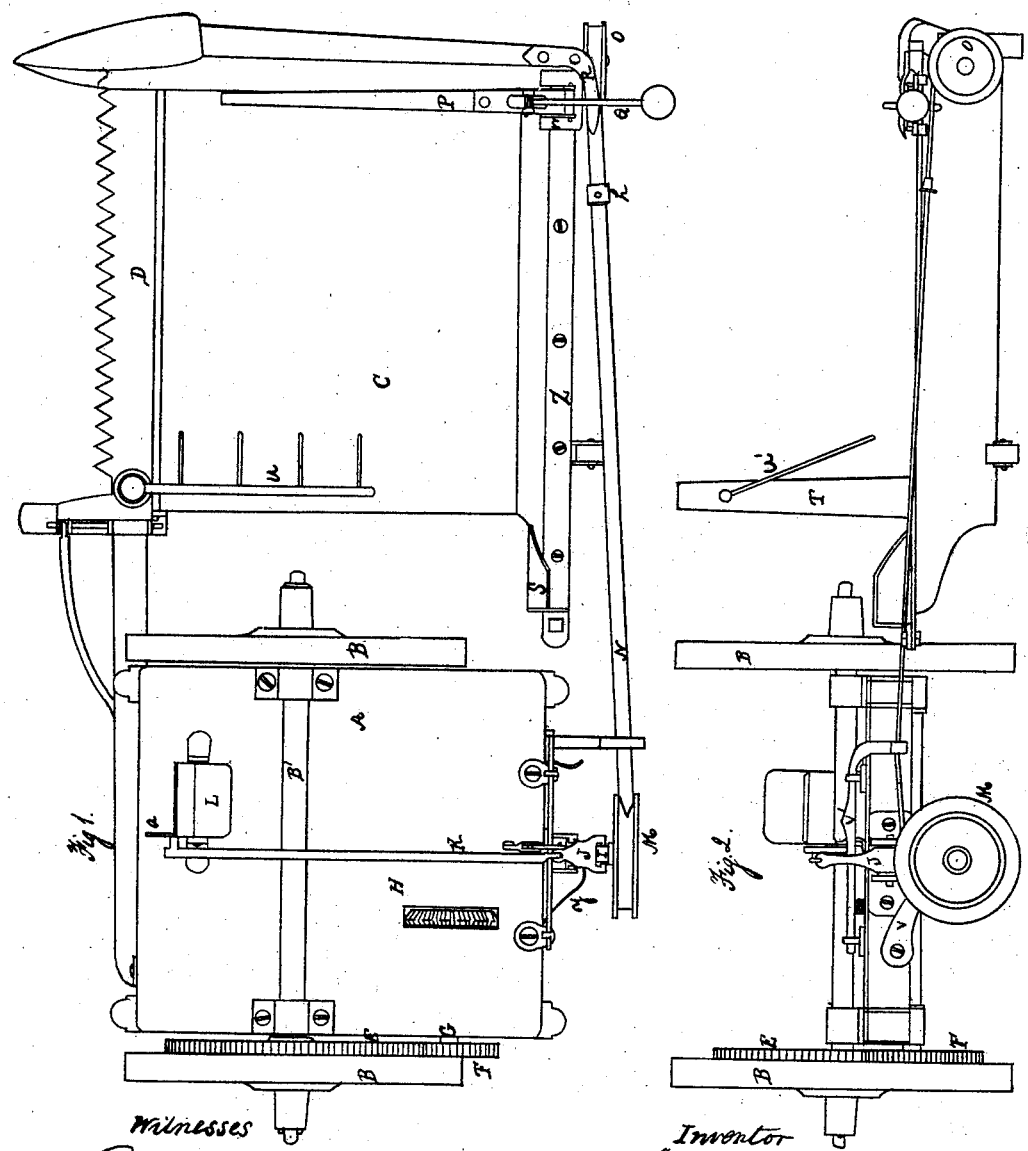

2 Sheets—Sheet 2.

J. B. SWEETLAND.
HARVESTER RAKE.

No. 76,000. Patented Mar. 24, 1868.

Witnesses
V. D. Stockbridge

Inventor
J. B. Sweetland
her
Alexander D. Mason
Atty.

United States Patent Office.

JEROME B. SWEETLAND, OF PONTIAC, MICHIGAN.

*Letters Patent No. 76,000; dated March 24, 1868.*

IMPROVEMENT IN HARVESTER-RAKES.

*The Schedule referred to in these Letters Patent and making part of the same.*

TO ALL WHOM IT MAY CONCERN:

Be it known that I, JEROME B. SWEETLAND, of the city of Pontiac, in the county of Oakland, and in the State of Michigan, have invented a certain new and useful Improvement in Harvester-Rakes; and do hereby declare that the following is a full, clear, and exact description thereof, reference being had to the accompanying drawings, and to the letters of reference marked thereon.

In the annexed drawings, making part of this specification, A represents the main frame, B' the main axle, and B B the wheels of a reaping or mowing-machine; C represents the platform, and D the cutter-bar; all of which may be constructed in any of the well-known and usual ways. My improvement relates more particularly to the rake and its attachment.

The back of the platform, upon its upper edge, is provided with a plate or way, Z, upon which moves a slide, W. This slide embraces the sides of the way in such a manner that it is kept securely in position. To this slide is pivoted the rake P, at its rear end, so that it is allowed to rise above and fall upon the platform C, in the operation of raking the grain. Extending out from the back of the slide is a plate, n, the purpose of which will be described. Q represents a curved rod, which is hinged to the rake in such a manner as to be allowed only a partial rotation backward and forward upon its hinge. This rod is provided upon its outer end with a suitable ball or weight, and with a notch or shoulder at m. When the rake is raised, the notch at m catches under the outer end of plate n, and serves to hold the rake up. N represents a belt, which is attached near its centre to the slide W. This belt has one end attached to a pulley, M, and the other end to a spring-pulley, O.

The pulley O is placed upon a stationary shaft at one side of the platform, and has coiled within it a flat spring, similar to a clock-spring, one end of which is made fast to the shaft, while the other is made fast to the pulley. This pulley, with its spring, moves the rake in one direction upon the platform, while the pulley M moves it in the other.

On the inner face of one of the driving-wheels is secured a gear-wheel, E, which gears into another gear-wheel, F. The wheel F is secured upon one end of shaft G, which lies under the main frame A, and crosswise of it. Upon shaft G is secured a bevel-wheel, H, which gears into another bevel-wheel on a shaft, I, which runs at right angles to shaft G, and toward the rear of the frame. The pulley M is secured upon a clutch-sleeve, and this sleeve is passed over the outer end of shaft I. When this sleeve, J', is moved inwards, it clutches with pins or lugs on a stationary collar on shaft I, and thus stations the clutch-sleeve and pulley upon the shaft, but when the pulley is at the extremity of the shaft, it is stationary, while the shaft revolves. J represents a forked lever, which takes at its forked end into a groove in the sleeve J', and serves to move it inward, while a spring, V, pressing against it, serves to move it outward. e e represent two small bars, which are pivoted together near one end. One end of these bars is pivoted to a little standard on the main frame, while one end of the other bar is pivoted to the lever J. When the pulley M is thrown inward and in gear, the two bars e e straighten to the same line, or until their pivots are all in line, and thus serve to brace the lever and keep it in this position. These bars are thrown up, so that the spring V can throw the pulley M out of gear, by means of a bar, V'. This bar V' runs through keepers or loops on the back of the main frame, and beneath the bars e e. One end of the bar is provided, after being suitably bent, with a hole or opening, through which the belt N passes, and a plate, h, upon this belt catches against the bar V', and moves it lengthwise, so that an elevation upon said bar passes under the bars e e, and throws them off of their centres.

K represents a rod, the rear end of which is attached to the upper end of lever J, while the forward end is attached to a foot-piece, L. This foot-piece is hinged to the main frame, and has a ring or pin on each side to keep it from moving too far, or rather revolving beyond a certain point, either forward or backward. When the driver wishes to throw the rake in gear, he pushes the foot-piece backward; this causes the rod K to move lever J, and throw the pulley M in gear with the shaft I.

When the pulley M revolves, it winds the belt N around it, and draws the rake in one direction across the platform C, but as soon as the stop or plate h strikes bar V', and throws pulley M out of gear, the spring in pulley O causes said pulley to revolve in an opposite direction, and wind the belt around it, and thus draw the rake back again over the platform. The rake, however, as it returns, is raised at an angle of forty-five degrees or more to the platform, so that it will not strike the grain which has fallen.

The rake is raised by means of an inclined guide-plate, S, which is secured near the way Z, and at that side of the platform next to the main frame. When the rake runs over this guide-plate, said plate causes it to turn upon its hinge until the notch at m on rod Q catches beneath the plate n on the slide W. The rake remains in this position until drawn across the platform, when the rod Q comes in contact with a pointed bar, R, which throws its notch from connection with plate n, and allows the rake to fall upon the platform, in position to rake grain off when desirable.

T represents the reel-standard. An arm, u, projects from this standard over the platform, as seen Figure 1, said arm being provided with teeth, u'. The object of this toothed arm is, in case it is necessary to have more room between one of the wheels B and the inner side of the platform, than is usually had by using this rack or guard, the inner end of the platform can be cut off, and give more room for the grain to drop clear.

Having thus fully described my invention, what I claim as new, and desire to secure by Letters Patent, is—

1. The rod Q, with its weight and notch, used with the plate n for holding up the rake, as is herein fully set forth.

2. The pulleys M and O, and belt N, used with the rake P for giving it motion, the pulley O being provided with a spring, which draws the rake back after it has been carried forward by the pulley M, substantially as set forth.

3. The arrangement of pulley M and sleeve J' upon shaft I, with the lever J, spring X, and rod K, as and for the purpose herein specified.

4. The bars e e, in combination with lever J and trip-bar V', which is operated upon by the plate h on belt N, as and for the purpose specified.

5. The bar R, in combination with the rod Q upon the rake, used as and for the purpose described.

6. The rack or guard u upon the reel-standard, when used substantially as and for the purpose set forth.

In testimony that I claim the foregoing, I have hereunto set my hand, this 14th day of January, 1868.

JEROME B. SWEETLAND.

Witnesses:
   A. W. BURTT,
   E. F. DRURY.